United States Patent [19]
Meyer

[11] Patent Number: 5,861,773
[45] Date of Patent: Jan. 19, 1999

[54] CIRCUIT FOR DETECTING THE LOCKED CONDITION OF PSK OR QAM

[75] Inventor: Jacques Meyer, Corenc, France

[73] Assignee: SGS-Thomson Microelectronics S.A., Saint Genis, France

[21] Appl. No.: 982,979

[22] Filed: Dec. 2, 1997

Related U.S. Application Data

[63] Continuation of Ser. No. 675,632, Jul. 1, 1996, Pat. No. 5,703,526.

[30]      Foreign Application Priority Data

Jul. 6, 1995   [FR]   France ................................. 95 08401

[51] Int. Cl.$^6$ ................................................. H04L 27/22
[52] U.S. Cl. .................... 329/304; 329/308; 331/DIG. 2; 375/327; 375/329
[58] Field of Search ..................................... 329/304, 308, 329/309; 331/DIG. 2; 375/326, 327, 328, 329

[56]            References Cited

U.S. PATENT DOCUMENTS

| | | | |
|---|---|---|---|
| 4,057,762 | 11/1977 | Namiki | 375/376 |
| 4,736,386 | 4/1988 | Nichols | 375/224 |
| 4,853,642 | 8/1989 | Otani et al. | 329/306 |
| 4,870,382 | 9/1989 | Keate et al. | 331/4 |
| 4,958,360 | 9/1990 | Sari | 375/344 |
| 4,987,375 | 1/1991 | Wu et al. | 329/309 |
| 5,121,071 | 6/1992 | Kelly et al. | 329/307 |

FOREIGN PATENT DOCUMENTS

C-42 16 156   8/1993   Germany.

OTHER PUBLICATIONS

IEEE Transactions on Communication, vol. 30, No. 10, Oct. 1982 New York, US, pp. 2385–2390, Yoshio Matsuo & Junji Namiki, "Carrier Recovery Systems For Arbitrarily Mapped APK Signals".

*Primary Examiner*—Siegfried H. Grimm
*Attorney, Agent, or Firm*—Wolf, Greenfield & Sacks, P.C.

[57]            ABSTRACT

A method for detecting a locked condition of a demodulator of at least one signal that may have discrete levels defining a constellation of nominal points in a plane. The method includes the steps of defining reference areas about the nominal points, a reference area being separated from another by a band or an angular sector crossing the origin of the constellation plane, and indicating a locked condition if the ratio of points occurring in the reference areas is above the probability for points to occur in the reference area, when the demodulator is wrongly adjusted.

6 Claims, 2 Drawing Sheets

CIRCUIT FOR DETECTING THE LOCKED CONDITION OF PSK OR QAM

This application is a continuation of application Ser. No. 08/675,632, filed Jul. 1, 1996, entitled A CIRCUIT FOR DETECTING THE LOCKED CONDITION OF PSK AND QAM DEMODULATORS, now U.S. Pat. No. 5,703,526.

BACKGROUND OF THE INVENTION

1. Field of the Invention

The present invention relates to PSK (Phase-Shift Keying) and QAM (Quadrature Amplitude Modulation) modulation techniques for simultaneously transmitting a plurality of bits. The present invention more particularly relates to the detection of the locked condition of PSK or QAM demodulators.

2. Discussion of the Related Art

FIG. 1 schematically represents a conventional QPSK (Quadrature PSK) demodulator. Such a QPSK demodulator is used to extract from a signal Sm two binary signals I and Q modulated in phase quadrature. Signal Sm is generally expressed by I cos $\omega t$+Q sin $\omega t$, where cos $\omega t$ and sin $\omega t$ are two carriers having the same frequency $\omega/2\pi$, but are in phase quadrature. Signal Sm is applied to two multipliers 10 and 11 which further receive signal cos $\omega t$ and signal sin $\omega$, respectively, provided by a voltage controlled oscillator (VCO) 13 connected in a phase-locked loop (PLL). If the frequency of oscillator 13 is close to the frequency of the carrier, multiplier 10 provides a signal having a mean value corresponding to signal I and an a.c. component whose frequency is twice the carrier's frequency. Similarly, multiplier 11 provides a signal having a mean value corresponding to signal Q and an a.c. component whose frequency is twice the carrier's frequency. Low-pass filters 15 eliminate the a.c. components of the outputs of multipliers 10 and 11 and respectively provide signals I and Q.

A phase detector 17 receives signals I and Q and provides a signal $\phi$ indicative of the phase error of signals I and Q. Signal $\phi$ controls the frequency of oscillator 13 so that the phase difference $\phi$ tends to zero. Generally, signal $\phi$ is applied to oscillator 13 through a low-pass filter 19 whose cut-off frequency is very low so that oscillator 13 is only controlled by the mean variations of signal $\phi$.

FIG. 2A illustrates a conventional representation, in the form of a "constellation", of the possible combinations of the demodulated binary signals I and Q. The values of signal I are read along a horizontal axis I, and the values of signal Q are read along a vertical axis Q. In QPSK modulation, each signal I and Q has a positive value or a negative value of the same amplitude, corresponding to the high and low logic levels. The nominal constellation, corresponding to the case where the signals provided by oscillator 13 are in phase with the two carriers in quadrature, includes four points P1-P4 that are symmetrical with respect to axes I and Q.

When the signals of oscillator 13 are phase shifted by an angle $\phi$ with respect to the carriers in quadrature, one obtains an effective constellation rotated by an angle $\phi$ with respect to the nominal constellation P1-P4, as shown in FIG. 2A. In addition, if the frequency of oscillator 13 differs from the frequency of the carrier, angle $\phi$ increases, i.e., the effective constellation rotates, at a speed equal to the frequency difference between the carrier and the oscillator 13.

FIG. 2B represents the phase error variation $\phi$ when this phase difference is equal to $\Delta F$. Signal $\phi$ is a saw-tooth varying between $-\pi/4$ and $+\pi/4$ at a frequency equal to $4\Delta F$ (the effective constellation reaches its nominal condition at each quarter of turn).

If the frequency difference $\Delta F$ is low (within the passband of filter 19), the control signal of oscillator 13 follows the variation of signal $\phi$ and rapidly adjusts the frequency of oscillator 13 so that signal $\phi$ does not reach one of the limits $-\pi/4$ or $+\pi/4$. In contrast, if the frequency difference $\Delta F$ is important (much higher than the cut-off frequency of filter 19), signal $\phi$ varies so rapidly that the control signal of oscillator 13 cannot vary at the same speed. Then, signal $\phi$ becomes a saw-tooth as represented in FIG. 2B, and the control signal of oscillator 13 establishes at the mean value, i.e. zero, of this saw-tooth signal. As a consequence, oscillator 13 is in a steady state but is set at an erroneous frequency.

To avoid this situation, lock detection circuits are used for directly analyzing signal $\phi$ and for indicating a lock condition when the amplitude of signal $\phi$ is between two thresholds. When signal $\phi$ exceeds these thresholds, oscillator 13 is forced, for example, to scan through its frequency range until a signal $\phi$ varying below these thresholds is obtained.

However, signal $\phi$ is often excessively noisy, which does not allow it to be compared with a threshold.

SUMMARY OF THE INVENTION

An object of the present invention is to provide a detector for detecting a locked condition of a demodulator, that is efficient even if the phase error signal $\phi$ is excessively noisy.

To achieve this and other objects, the present invention provides a method for detecting a locked condition of a demodulator of at least one signal that may have discrete levels defining a constellation of nominal points in a plane. The method includes the steps of defining reference areas about the nominal points, a reference area being separated from another by a band or an angular sector crossing the origin of the constellation plane, and indicating a locked condition if the ratio of points occurring in the reference areas is above the probability for points to occur in the reference areas when the demodulator is wrongly (i.e., incorrectly or erroneously) adjusted.

According to an embodiment of the invention, each of the reference areas is defined between two lines crossing the origin of the constellation plane.

According to an embodiment of the invention, the method is applied to QPSK demodulation. The lines are in the number of four with respective slopes of 2, ½, –½, and –2.

The invention also relates to a circuit for detecting a locked condition of a QPSK demodulator, including two absolute value circuits respectively receiving two quadrature demodulated signals; a circuit for providing the maximum and minimum values of the outputs of the two absolute value circuits; means for enabling a counter according to the sign of the difference between the maximum value and the product of the minimum value by a factor higher than 1; and means for asserting a lock indication signal when the content of the counter reaches a predetermined value.

According to an embodiment of the present invention, the counter is an up/down counter whose counting mode is selected by the sign and whose highest significant bit constitutes the lock indication signal.

The foregoing and other objects, features, aspects and advantages of the invention will become apparent from the following detailed description of the present invention when taken in conjunction with the accompanying drawings.

DETAILED DESCRIPTION

An aspect of the invention is to remark that representative points, in a constellation plane, of one or more signals restored by a demodulator, have a maximum probability to occur near points of a nominal constellation, when the demodulation oscillator 13 is suitably adjusted. When oscillator 13 is erroneously adjusted, the effective points continuously rotate from one nominal point to another, with the result that the maximum probability is not located near the nominal points but is uniformly distributed over rings including the paths of the effective points. As a result, the maximum probability for effective points to occur near the nominal points significantly decreases when the oscillator is erroneously adjusted.

To carry out lock detection, the present invention defines reference areas in which the points have a maximum probability to occur when the oscillator is suitably adjusted, and a much lower minimum probability otherwise. The number of points occurring in these areas is counted and a lock condition is detected when, in a group of occurred points, the ratio of counted points exceeds a threshold above the minimum probability. Such reference areas can be arbitrary areas surrounding the nominal points, provided that two such areas can be separated by a band or an angular sector crossing the origin of the constellation plane.

Figure 3:
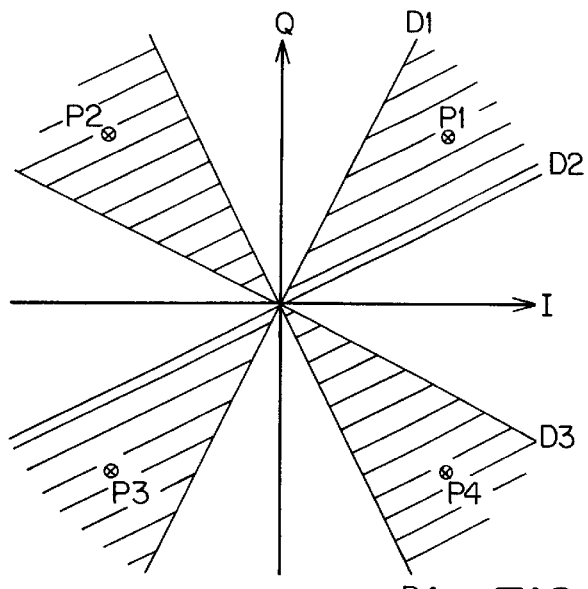
FIG. 3 represents an exemplary partition, according to the invention, of a constellation plane into areas having a high probability of containing an effective constellation.

FIG. 3 represents exemplary reference areas according to the invention, for a QPSK demodulation. A first hatched area, assigned to nominal points P1 and P3, is defined between two lines DI and D2 crossing the origin of the constellation plane. A second hatched area, assigned to nominal points P2 and P4, is defined between two lines D3 and D4 crossing the origin. Lines D1–D4 have respective slopes $k$, $1/k$, $-1/k$, and $-k$, where k is a number higher than 1.

To determine whether a point (I, Q) occurs in one of the defined reference areas, it is sufficient to ascertain the relation:

$|I|/k < |Q| < k |I|$, or the relation:

$\max(|I|, |Q|) - k \min(|I|, |Q|) < 0$.

Coefficient k is selected to obtain relatively narrow reference areas while ensuring a high probability for effective points to occur in these areas when the oscillator is suitably adjusted.

When k=2, the probability for points to occur in the reference areas is 0.41 when the oscillator is erroneously adjusted and close to 1 when the oscillator is suitably adjusted. The lock detection threshold is then selected at a ratio of 0.5, for example.

Figure 1:
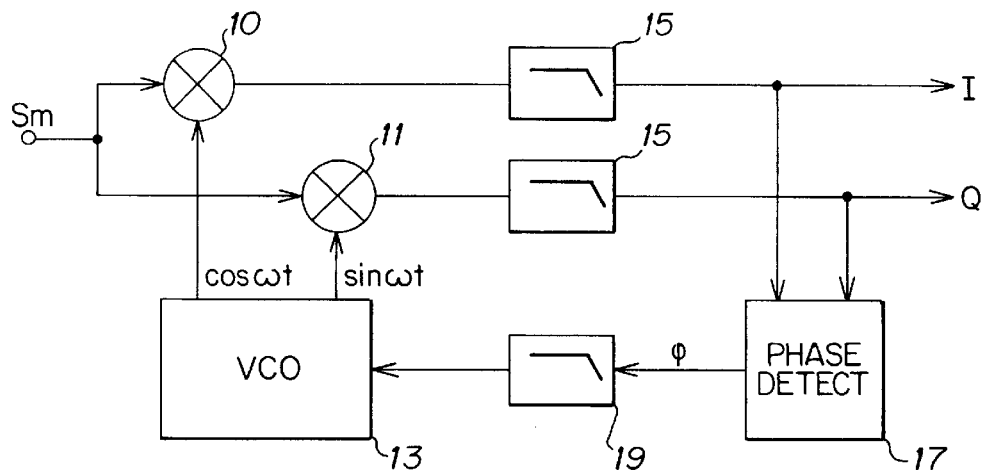
FIG. 1, above described, schematically represents a conventional QSPK demodulator.
Figure 2A:
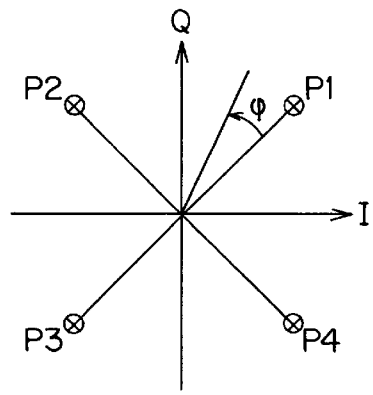
FIG. 2A represents, in the form of a constellation, the possible combinations of signals restored by the demodulator of FIG. 1.
Figure 2B:
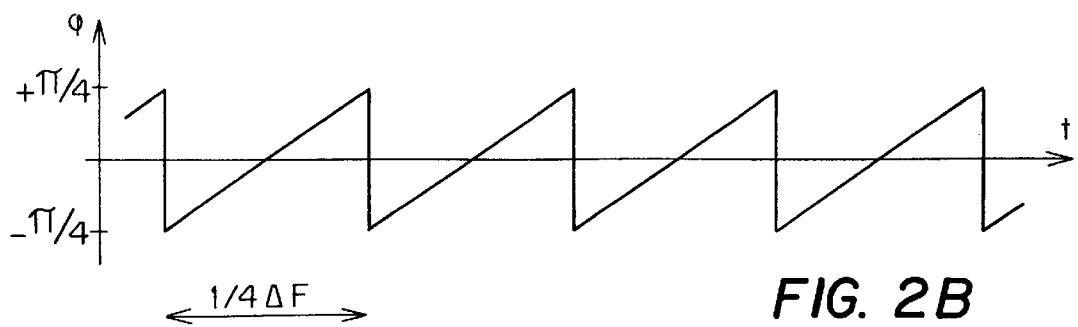
FIG. 2B represents the possible variations of a phase error signal.
Figure 4:
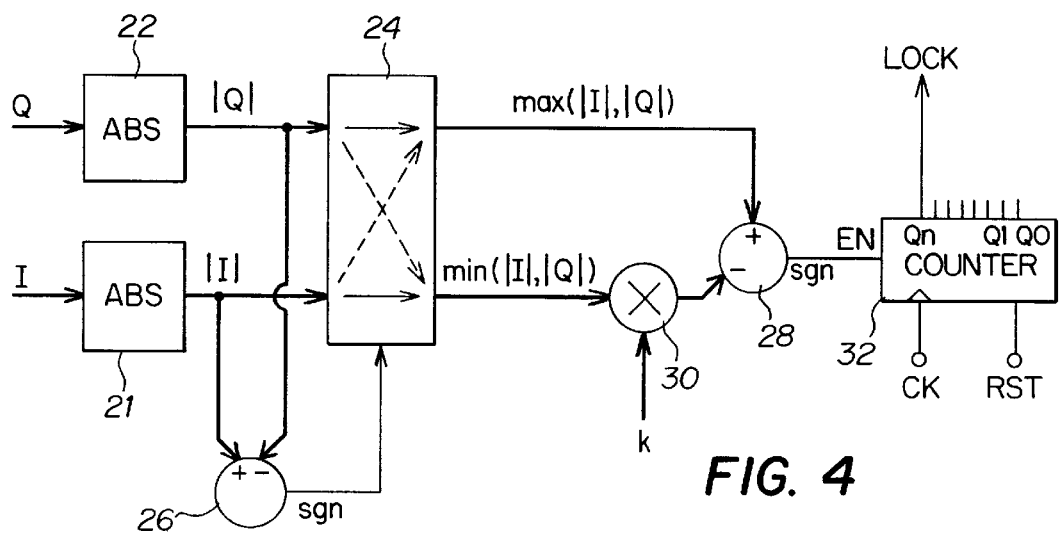
FIG. 4 represents an embodiment of a lock detection circuit according to the present invention, in the exemplary case of FIG. 3.

FIG. 4 represents an embodiment of a lock detection circuit implementing the method according to the invention described with relation to FIG. 3. This detection circuit is realized in a digital form. Actually, most of the demodulator's functions shown in FIG. 1 are frequently realized in digital form so that they are integrable at low cost.

The digital samples of signals I and Q are provided to absolute value circuits 21 and 22, respectively. The outputs |I| and |Q| of circuits 21 and 22 are provided to a switch 24 for transmitting these outputs directly or crossed. A subtracter 26 calculates the difference between outputs |I| and |Q| and the sign sgn of this difference controls switch 24.

With this configuration, one of the outputs of switch 24 provides the maximum value, max (|I|, |Q|) of the outputs of circuits 21 and 22. The other output provides the minimum value min (|I|, |Q|), of the outputs of circuits 21 and 22. A subtracter 28 calculates the difference between value max (|I|, |Q|) and value min (|I|, |Q|), previously multiplied by k by a multiplier 30. If k=2, multiplier 30 carries out a simple wired one bit left-shift. The sign bit sgn provided by subtracter 28 is "1" when signals I and Q correspond to a point situated in one of the reference areas defined by lines D1–D4 of FIG. 3.

In order to count the number of points occurring in these reference areas, the sign bit sgn of subtracter 28 constitutes, for example, an enable signal EN for a counter 32 timed by a clock CK at the occurrence frequency of the points.

A lock indication signal LOCK is enabled when the content of counter 32 reaches a predetermined threshold. Signal LOCK corresponds, for example, to the most significant bit Qn of the counter. Counter 32 is periodically reset by a signal RST having a frequency significantly lower than the occurrence frequency of the points, for example 1000 times lower, so as to analyze sufficiently representative groups of points.

Figure 5:
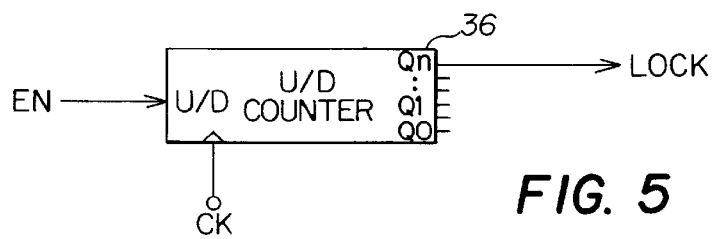
FIG. 5 represents an alternative element of the circuit of FIG. 4.

FIG. 5 illustrates a second approach for detecting a lock condition in the case where the detection threshold is set to a ratio of 0.5. An up/down counter 36 timed by clock CK replaces the counter 32 of FIG. 4. The enable signal EN selects its up-counting mode by level 1 and its down-counting mode by level 0.

With this configuration, the up/down counter 36 accumulates the difference between the number of valid points occurring in the reference areas and the number of non-valid points occurring outside the reference areas. If the average number of valid points is higher than the average number of non-valid points, the content of the up/down counter increases until it reaches its upper limit. The lock indication signal LOCK is provided, for example, by the most significant bit Qn of the up/down counter. The time needed to reach this upper limit, and therefore the number of points for which the difference is accumulated, vary as a function of the number of bits of the up/down counter and of the adjustment error of the oscillator. The number of bits of the up/down counter 36 is selected so that the difference is accumulated for a sufficiently representative group of points. In the example of FIG. 3, an 8-bit up/down counter can be chosen.

The up/down counter is preferably connected so as to saturate instead of overflowing, i.e., when it reaches its upper or lower limit without the counting mode being changed, an additional clock pulse no longer changes the state of the up/down counter.

The reference areas defined by lines as in FIG. 3 enable the realization of a very simple lock detector. Of course, these reference areas can be defined by other geometric figures, such as circles centered on the nominal points.

The circuit of FIG. 4 can be used to obtain, in addition to lock detection, useful values for the demodulator, such as the phase error |I|−|Q| at the output of subtracter 26 and the module of vector (I, Q), expressed approximately by max (|I|, |Q|)+½ min (|I|, |Q|).

The present invention has been described for QPSK modulation, in which two bits are transmitted through two binary signals, but it also applies to other types of modulation for transmitting a plurality of bits, such as QAM modulation, in which each of two quadrature modulated signals may have more than two discrete levels.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A method for detecting a locked condition of a demodulator operating upon a plurality of QPSK signals that each has at least one discrete level that corresponds to one of a predetermined plurality of nominal points in a constellation plane, wherein the demodulator restores the plurality of QPSK signals by generating a plurality of effective points in the constellation plane, each one of the plurality of effective points corresponding to one of the plurality of QPSK signals, the method comprising the steps of:

(A) defining a plurality of reference areas in the constellation plane, each of the plurality of reference areas being defined between two lines crossing an origin of the constellation plane; and (B) indicating the locked condition when a percentage of the plurality of effective points generated by the demodulator occurring in the plurality of reference areas is within a range of probability for effective points to occur in the plurality of reference areas when the demodulator is in the locked condition;

wherein step (A) includes a step of defining the plurality of reference areas by a plurality of lines including four lines having slopes of k, 1/k, −1/k, and −k respectively, where k is a real number equal to at least 2;

wherein each one of the plurality of effective points has a first component and a second component, said first and second components corresponding to locations in the constellation plane; and wherein step (B) includes a step of determining, for each one of the plurality of effective points, whether the one of the plurality of effective points occurs in one of the plurality of reference areas by:

multiplying a minimum value, equal to a lesser of an absolute value of the first component of the one of the plurality of effective points and an absolute value of the second component of the one of the plurality of effective points, by a number greater than 1 to produce a modified value for the one of the plurality of effective points;

subtracting the modified value from a maximum value, equal to a greater of an absolute value of the first component of the one of the plurality of effective points and an absolute value of the second component of the one of the plurality of effective points, to produce a subtraction value for the one of the plurality of effective points; and analyzing a sign of the subtraction value to determine whether the one of the plurality of effective points occurs in one of the plurality of reference areas.

2. A circuit that detects a locked condition of a demodulator operating upon a plurality of QPSK signals that each has at least one discrete level that corresponds to one of a predetermined plurality of nominal points in a constellation plane, wherein the demodulator restores the plurality of QPSK signals by generating first and second quadrature demodulated signals for each of the plurality of QPSK signals that define a plurality of effective points in the constellation plane, each one of the plurality of effective points corresponding to one of the plurality of QPSK signals, the circuit comprising:

a first absolute value circuit that receives the first quadrature demodulated signal for each of the plurality of QPSK signals and generates a first absolute value of the first quadrature demodulated signal;

a second absolute value circuit that receives the second quadrature demodulated signal for each of the plurality of QPSK signals and generates a second absolute value of the second quadrature demodulated signal;

a comparison circuit, coupled to the first and second absolute value circuits, that receives the first and second absolute values and generates a maximum value and a minimum value for the first and second absolute values; and a counter that is enabled to count according to a difference between the maximum value and a product of the minimum value and a multiplication factor, the counter having at least one output indicative of the locked condition.

3. The circuit of claim 2, wherein the comparison circuit further comprises a subtraction circuit to subtract the first absolute value from the second absolute value to generate a phase error.

4. The circuit of claim 2, wherein the circuit further comprises a multiplication circuit that multiplies the minimum value and the multiplication factor to generate the product; and a subtraction circuit that subtracts the product from the maximum value to generate the difference.

5. The circuit of claim 2, wherein the counter is an up/down counter having a counting mode selected according to a sign of the difference between the maximum value and the product of the minimum value and the multiplication factor.

6. A system for detecting a locked condition of a demodulator that operates upon a plurality of QPSK signals that each has at least one discrete level that corresponds to one of a predetermined plurality of nominal points in a constellation plane, the demodulator restoring the plurality of QPSK signals by generating a plurality of effective points in the constellation plane, each one of the plurality of effective points corresponding to one of the plurality of QPSK signals, the system comprising:

the demodulator; and means for indicating the locked condition when a percentage of the plurality of effective points generated by the demodulator occurring in a plurality of reference areas in the constellation plane is within a range of probability for effective points to occur in the plurality of reference areas when the demodulator is in the locked condition, each of the plurality of reference areas being defined between two lines crossing an origin of the constellation plane.

* * * * *